(12) United States Patent
Saglam et al.

(10) Patent No.: US 11,438,920 B2
(45) Date of Patent: Sep. 6, 2022

(54) DOWNLINK SCHEDULING OF TERMINAL DEVICES

(71) Applicant: Telefonaktiebolaget LM Ericsson (publ), Stockholm (SE)

(72) Inventors: Mehmet Izzet Saglam, Istanbul (TR); Irfan Bekleyen, Sollentuna (SE); Mesut Kartal, Üsküdar (TR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 34 days.

(21) Appl. No.: 16/769,749

(22) PCT Filed: Dec. 5, 2017

(86) PCT No.: PCT/EP2017/081494
§ 371 (c)(1),
(2) Date: Jun. 4, 2020

(87) PCT Pub. No.: WO2019/110088
PCT Pub. Date: Jun. 13, 2019

(65) Prior Publication Data
US 2020/0396755 A1 Dec. 17, 2020

(51) Int. Cl.
*H04W 72/12* (2009.01)

(52) U.S. Cl.
CPC ... *H04W 72/1273* (2013.01); *H04W 72/1221* (2013.01); *H04W 72/1226* (2013.01)

(58) Field of Classification Search
CPC ......... H04W 72/1273; H04W 72/1221; H04W 72/1226; H04L 47/626
See application file for complete search history.

(56) References Cited

U.S. PATENT DOCUMENTS

| 6,879,561 | B1 * | 4/2005 | Zhang ................. | H04L 1/0017 370/235 |
| 7,558,201 | B2 * | 7/2009 | Sang ................. | H04L 47/10 370/230 |
| 10,237,877 | B1 * | 3/2019 | Singh ................. | H04W 52/365 |

(Continued)

FOREIGN PATENT DOCUMENTS

WO 02085054 A2 10/2002

OTHER PUBLICATIONS

S. Nonchev and M. Valkama, "Efficient Packet Scheduling Schemes for Multiantenna Packet Radio Downlink," 2009 Fifth Advanced International Conference on Telecommunications, 2009, pp. 404-409, doi: 10.1109/AICT.2009.73. (Year: 2009).*

(Continued)

*Primary Examiner* — Ivan O Latorre
(74) *Attorney, Agent, or Firm* — Murphy, Bilak & Homiller, PLLC (57) ABSTRACT

There is provided mechanisms for downlink scheduling of terminal devices. A method is performed by a network node. The method comprises obtaining user-specific delay and user-specific channel conditions per scheduling opportunity for each of the terminal devices to be scheduled. The method comprises scheduling, in each scheduling opportunity, the terminal devices according to an order. The order is determined by individually weighting the user-specific delay and individually weighting the user-specific channel conditions for each terminal device to be scheduled.

25 Claims, 5 Drawing Sheets

(56) References Cited

U.S. PATENT DOCUMENTS

| | | | | |
|---|---|---|---|---|
| 10,660,115 B1* | 5/2020 | Marupaduga | ..... | H04W 72/1268 |
| 10,833,832 B2* | 11/2020 | Yeh | ..... | H04W 72/121 |
| 2006/0013245 A1* | 1/2006 | Abedi | ..... | H04L 47/52 |
| | | | | 370/433 |
| 2006/0153216 A1* | 7/2006 | Hosein | ..... | H04L 1/0018 |
| | | | | 370/412 |
| 2007/0070894 A1* | 3/2007 | Wang | ..... | H04W 72/1242 |
| | | | | 370/230 |
| 2007/0116024 A1* | 5/2007 | Zhang | ..... | H04L 47/54 |
| | | | | 370/412 |
| 2008/0137537 A1* | 6/2008 | Al-Manthari | ..... | H04W 72/1257 |
| | | | | 370/238 |
| 2010/0189060 A1* | 7/2010 | Wang | ..... | H04L 47/626 |
| | | | | 370/329 |
| 2010/0278152 A1* | 11/2010 | Andreozzi | ..... | A61P 1/06 |
| | | | | 370/335 |
| 2014/0086178 A1* | 3/2014 | Rangarajan | ..... | H04W 72/1226 |
| | | | | 370/329 |
| 2015/0117344 A1* | 4/2015 | Arvidsson | ..... | H04W 76/10 |
| | | | | 370/329 |
| 2015/0131537 A1* | 5/2015 | Chiang | ..... | H04L 5/0073 |
| | | | | 370/329 |
| 2016/0249354 A1 | 8/2016 | Crosby | | |
| 2017/0164282 A1* | 6/2017 | Zhang | ..... | H04W 72/1236 |

OTHER PUBLICATIONS

Capozzi, F., et al., "Downlink Packet Scheduling in LTE Cellular Networks: Key Design Issues and a Survey", IEEE Communications Surveys & Tutorials, vol. 15, No. 2, Second Quarter 2013, 2013, pp. 678-700.

Hendaoui, Saloua, et al., "Downlink scheduling for real time application over LTE-A network: Delay aware scheduling", IEEE, 2015, pp. 1-6.

Unknown, Author, "3rd Generation Partnership Project; Technical Specification Group Services and System Aspects; Policy and charging control architecture (Release 15)", 3GPP TS 23.203 V15.0.0, Sep. 2017, pp. 1-257.

* cited by examiner

DOWNLINK SCHEDULING OF TERMINAL DEVICES

TECHNICAL FIELD

Embodiments presented herein relate to a method, a network node, a computer program, and a computer program product for downlink scheduling of terminal devices.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the scheduling of packets to and from terminal devices served in the communications network.

The general task of the scheduler is to control the allocation of shared time/frequency resources (such as physical resource blocks; PRBs) among the terminal devices at each scheduling opportunity. The scheduler is commonly located in a network node of the network and assigns uplink and downlink resources to the served terminal devices according to a scheduling scheme. For example, the scheduler might determine to which terminal device or terminal devices the shared resources should be allocated in each transmission time interval (TTI).

As an example, in so-called Round Robin (RR) scheduling, also referred to as Resource Fair (RF) scheduling, an equal amount of resources is distributed to each terminal device in turn, irrespective of their prevailing channel conditions. RR scheduling is thus resource fair in the sense that each terminal device has equal use of the resources and the interval between the resources in two adjacent scheduling opportunities is the same for all terminal devices. However, this type of scheduling might be ineffective for terminal devices with unequal channel conditions.

Another type of scheduling is to assign resources to the terminal devices according to the best reported channel conditions. This is generally referred to as maximum channel quality indicator (CQI) scheduling. As its name implies, maximum CQI scheduling uses CQI feedback from the terminal devices to observe the channel quality. However, this type of scheduling might result in that those terminal devices having worst channel conditions are assigned inadequate resources.

Hence, there is still a need for an improved scheduling.

SUMMARY

An object of embodiments herein is to provide efficient downlink scheduling of terminal devices.

According to a first aspect there is presented a network node for downlink scheduling of terminal devices. The network node comprises processing circuitry. The processing circuitry is configured to cause the network node to obtain user-specific delay and user-specific channel conditions per scheduling opportunity for each of the terminal devices to be scheduled. The processing circuitry is configured to cause the network node to schedule, in each scheduling opportunity, the terminal devices according to an order. The order is determined by individually weighting the user-specific delay and individually weighting the user-specific channel conditions for each terminal device to be scheduled.

According to a second aspect there is presented a network node for downlink scheduling of terminal devices. The network node comprises an obtain module configured to obtain user-specific delay and user-specific channel conditions per scheduling opportunity for each of the terminal devices to be scheduled. The network node comprises a schedule module configured to schedule, in each scheduling opportunity, the terminal devices according to an order. The order is determined by individually weighting the user-specific delay and individually weighting the user-specific channel conditions for each terminal device to be scheduled.

According to a third aspect there is presented a system for downlink scheduling of terminal devices. The system comprises at least one network node according to the first aspect or the second aspect. According to an embodiment the system further comprises at least one of the terminal devices to be scheduled.

According to a fourth aspect there is presented a method for downlink scheduling of terminal devices. The method is performed by a network node. The method comprises obtaining user-specific delay and user-specific channel conditions per scheduling opportunity for each of the terminal devices to be scheduled. The method comprises scheduling, in each scheduling opportunity, the terminal devices according to an order. The order is determined by individually weighting the user-specific delay and individually weighting the user-specific channel conditions for each terminal device to be scheduled.

According to a fifth aspect there is presented a computer program for downlink scheduling of terminal devices, the computer program comprising computer program code which, when run on a network node, causes the network node to perform a method according to the fourth aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously these network nodes, this system, this method, this computer program and this computer program product provide efficient downlink scheduling of terminal devices.

Advantageously the proposed downlink scheduling allows the maximum scheduling delay to be limited within acceptable values. For example, simulations show that the maximum delay can be limited to about 70 ms under realistic scenarios, where a delay of about 100 ms would cause packets to be dropped, depending on the actual realistic scenario.

Advantageously the proposed downlink scheduling allows for a fair balance between scheduling of terminal devices with real time critical applications and terminal devices with non-real time critical applications, as well as between terminal devices with delay critical applications and terminal devices with channel quality critical applications.

Advantageously the proposed downlink scheduling allows for computationally efficient as well as memory efficient implementation and execution.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
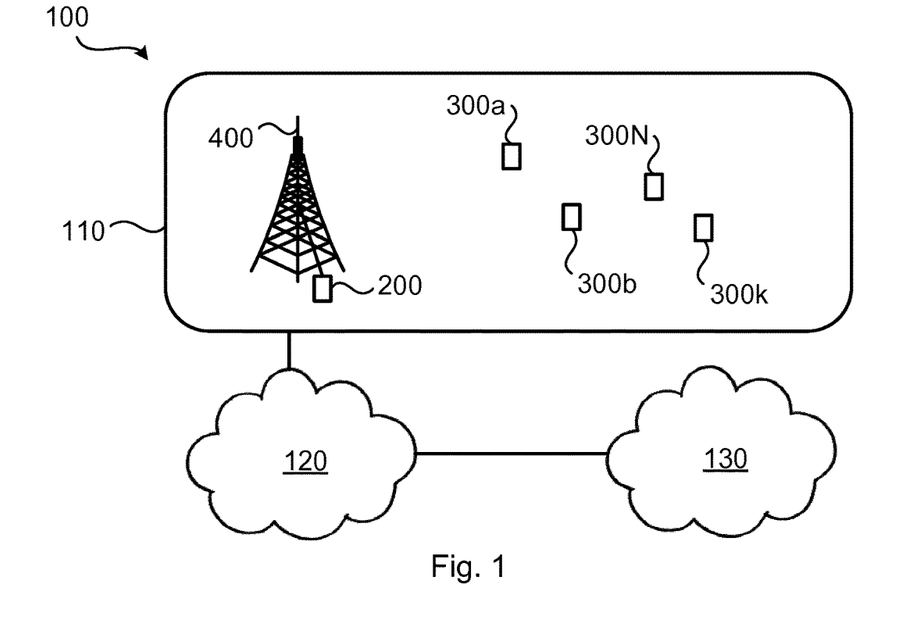
FIG. 1 is a schematic diagram illustrating a communications system according to embodiments.

FIG. 1 is a schematic diagram illustrating a communications system 100 where embodiments presented herein can be applied. The communications network 100 could be a third generation (3G) telecommunications network, a fourth generation (4G) telecommunications network, or a fifth (5G) telecommunications network and support any 3GPP telecommunications standard.

The communications system 100 comprises a network node 200 configured to, in a radio access network 110, provide network access to terminal devices 300a, 300b, ..., 300k, ... 300N. The radio access network 110 is operatively connected to a core network 120. The core network 120 is in turn operatively connected to a service network 130, such as the Internet. The terminal devices 300a, 300b, ..., 300k, ... 300N are thereby, via the network node 200, enabled to access services of, and exchange data with, the service network 130. Examples of network nodes are radio access network nodes, radio base stations, base transceiver stations, Node Bs, evolved Node Bs, g Node Bs, access points, and access nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

In general terms, the network node 200 provide network access in the radio access network 110 by transmitting signals to, and receiving signals from, the terminal devices 300a, 300b, ..., 300k, ... 300N. The signals could be transmitted from, and received by, a transmission and reception point (TRP) 400 of the network node 200. The TRP 400 could form an integral part of the radio network node 200 or be physically separated from the network node 200.

The network node 200 transmits signals to, and receives signals from, the terminal devices 300a, 300b, ..., 300k, ... 300N according to a scheduling order. However, as disclosed above there is a need for improved scheduling.

For many user applications the system delay is more important than the actual peak data rate. Some user applications such as content sharing (below denoted social and sharing), video conference, and voice conference do not tolerate high delays. Real Time (RT) and Non-RT applications can be classified into three classes:

Media Consumption (MC): Download throughput need is higher than uplink throughput need.

Real Time Conversational (RTC): Download and uplink throughput needs are balanced. Social and Sharing (SS): Uplink throughput need is higher than downlink throughput need.

It is further recognized that some user applications need a comparatively small amount of data transfer but frequent connections to the network.

Changes in the number of users, traffic and user habits make effective system resource sharing among terminal devices 300a, 300b, ..., 300k, ... 300N challenging.

The embodiments disclosed herein therefore relate to mechanisms for downlink scheduling of terminal devices 300a, 300b, ..., 300k, ... 300N. In order to obtain such mechanisms there is provided a network node 200, a method performed by the network node 200, a computer program product comprising code, for example in the form of a computer program, that when run on a network node 200, causes the network node 200 to perform the method.

Figure 2:
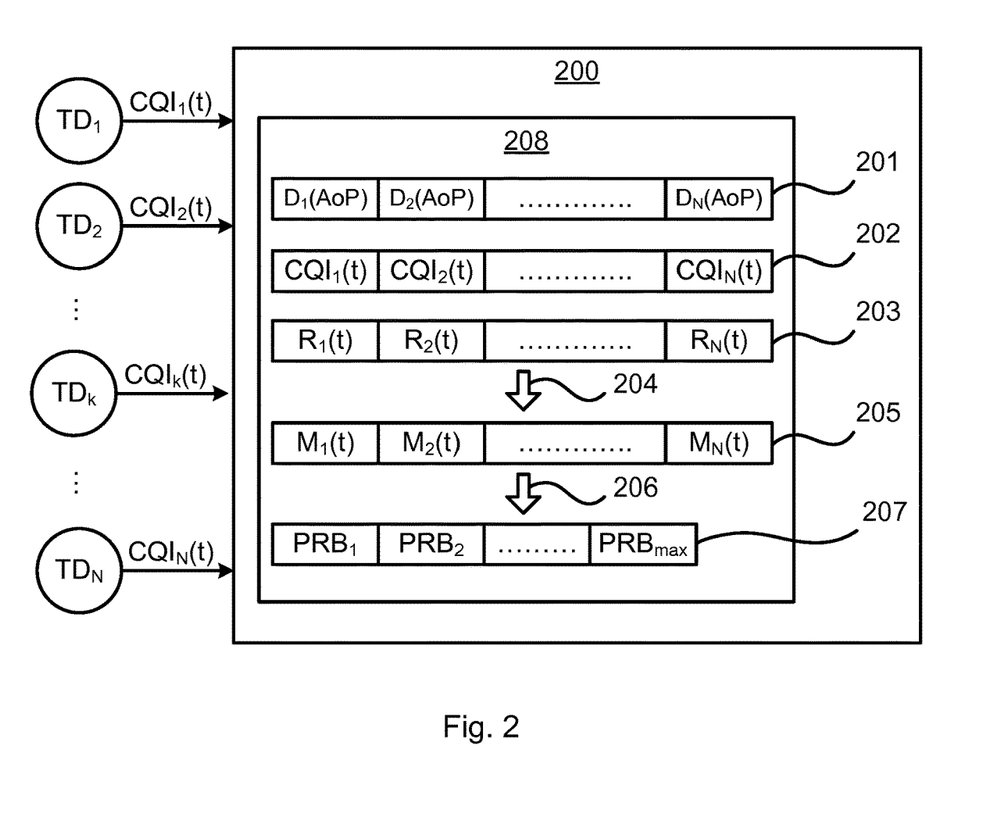
FIG. 2 is a schematic diagram of a scheduler in a network node.

FIG. 2 schematically illustrates a scheduler 208 in a network node 200 according to an embodiment. The scheduler 208 receives an individual delay value $D_k$ (AoP) 201 as well as an individual channel condition value $CQI_k(t)$ 202, as represented by a channel quality indicator (CQI), and (optionally) an individual instantaneous throughput value $R_k(t)$ 203 from each terminal device k (in FIG. 2 denoted $TD_k$ for short) for each scheduling opportunity occurring at time t. The scheduler 208 applies respective weighting factors to the individual delay values $D_k(AoP)$ 201, the individual channel condition values 202, and (optionally) the individual instantaneous throughput values 203. This is schematically symbolized by arrow 204. The scheduler then determines a scalar metric value $M_k(t)$ 205 for each terminal device k per scheduling opportunity. This metric is used as ranking operation. Thus, the scheduler 208 then uses the scalar metric values do determine the order in which the physical resource blocks (PRBs) 207 of the terminal devices are to be scheduled in the scheduling opportunity. This is schematically symbolized by arrow 206. $PRB_1$ is thus the first scheduled resource in the scheduling opportunity, followed by $PRB_2$, and so on, until the last scheduled resource $PRB_{max}$. Depending on the amount of terminal devices 300a, 300b, ..., 300k, ... 300N to be scheduled, the amount of resources needed by each terminal device 300a, 300b, ..., 300k, ... 300N, etc. it could be that one or more of the terminal devices 300a, 300b, ..., 300k, ... 300N is allocated two or more PRBs and/or that one or more of the terminal devices 300a, 300b, ..., 300k, ... 300N is not allocated any PRB in the scheduling opportunity. Further, there might be more PRBs than terminal devices, or vice versa.

Figure 3:
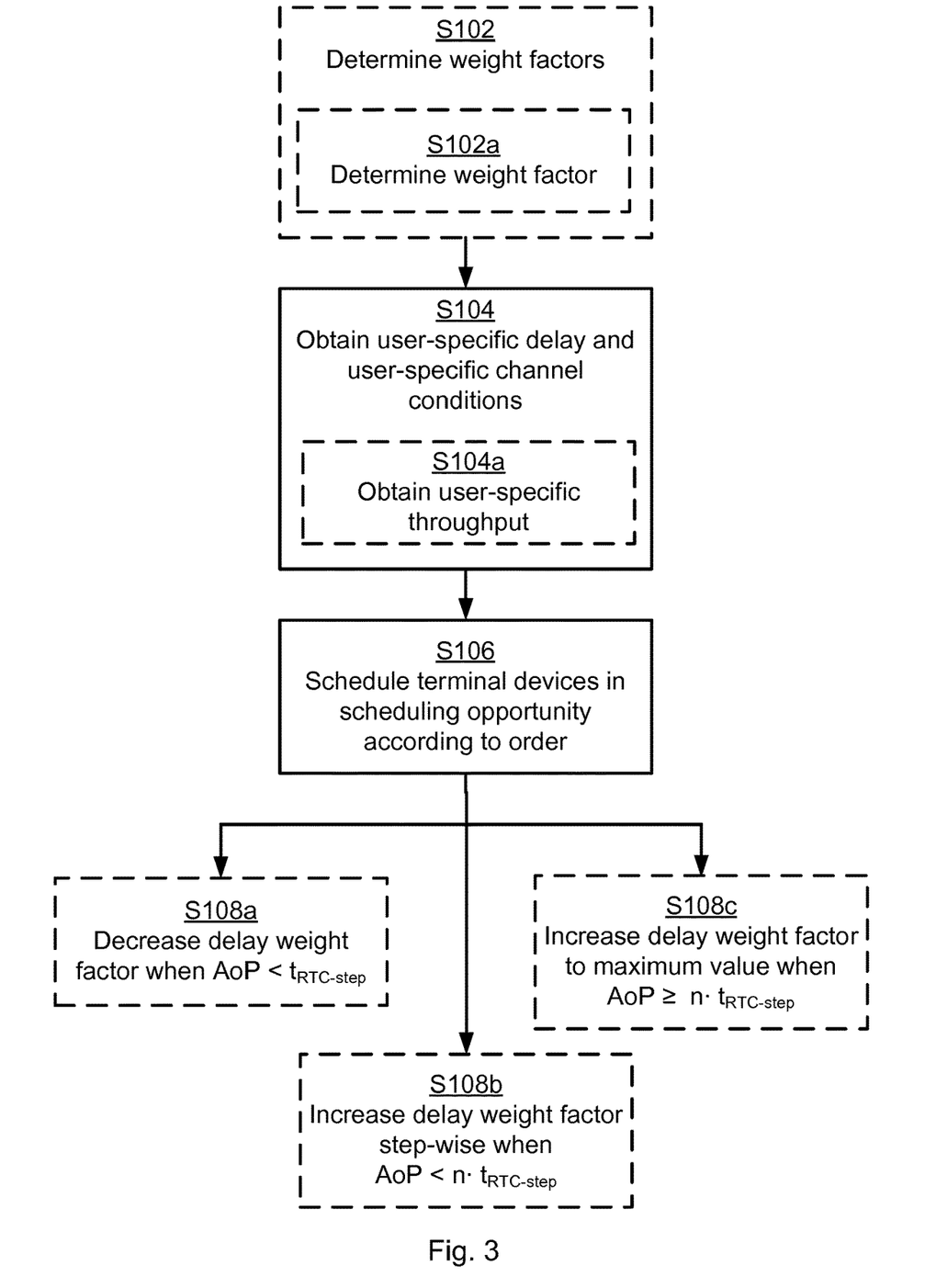
FIGS. 3 and 4 are flowcharts of methods according to embodiments.
Figure 4:
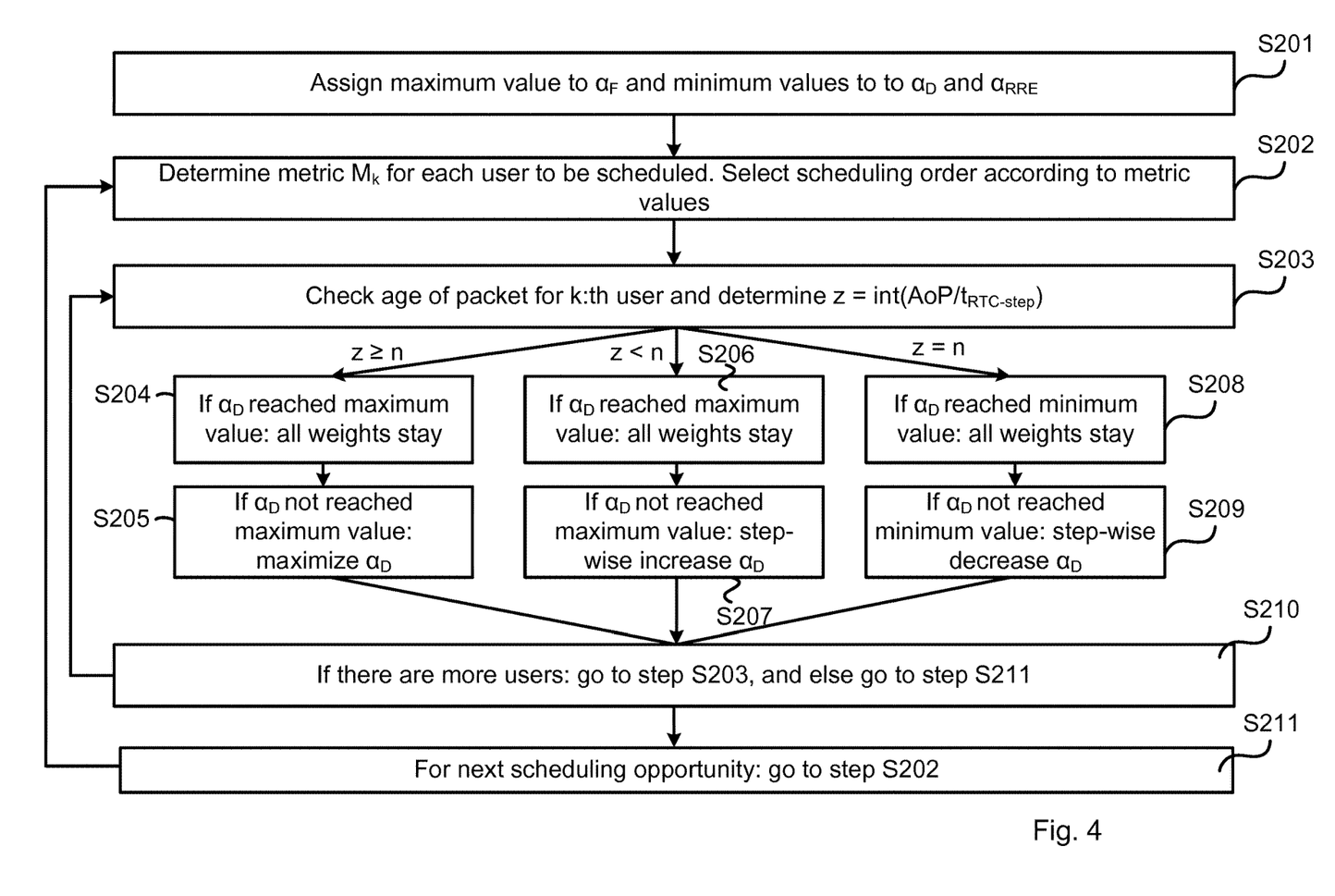

Further, and more detailed, operation of the network node 200 for scheduling the terminal devices 300a, 300b, ..., 300k, ... 300N will be disclosed with reference to FIGS. 3 and 4. The methods are performed by the network node 200. The methods are advantageously provided as computer programs 820.

FIG. 3 is a flowchart illustrating embodiments of methods for downlink scheduling of terminal devices 300a, 300b, ..., 300k, ... 300N.

The methods are based on scheduling users (as represented by the terminal devices 300a, 300b, ..., 300k, ... 300N) in an order determined by their adaptively weighted user-specific delay and user-specific channel conditions.

In order to perform such scheduling the network node 200 needs information about delay and channel conditions. The network node 200 is thus configured to perform step S104:

S104: The network node 200 obtains user-specific delay and user-specific channel conditions per scheduling opportunity for each of the terminal devices 300a, 300b, ..., 300k, ... 300N to be scheduled.

This enables the network node 200 to perform the aforementioned scheduling. Particularly, the network node 200 is configured to perform step S106:

S106: The network node 200 schedules, in each scheduling opportunity, the terminal devices 300a, 300b, ..., 300k, ... 300N according to an order. The order is determined by individually weighting the user-specific delay and individually weighting the user-specific channel conditions for each terminal device 300a, 300b, ..., 300k, ... 300N to be scheduled.

Embodiments relating to further details of downlink scheduling of terminal devices 300a, 300b, ..., 300k, ... 300N as performed by the network node 200 will now be disclosed.

As is implicitly understood, the scheduling of the terminal devices 300a, 300b, ..., 300k, ... 300N relates to downlink transmission of packets towards the terminal devices 300a, 300b, ..., 300k, ... 300N. Hence, packets are transmitted to the terminal devices 300a, 300b, ..., 300k, ... 300N according to the order given by the scheduling of the terminal devices 300a, 300b, ..., 300k, ... 300N.

In some aspects the scheduling is performed per TTI. That is, in some aspects the scheduling opportunity corresponds to one TTI.

In some aspects the scheduling also takes into account the throughput when scheduling the users. Particularly, according to an embodiment the network node 200 is configured to perform (optional) step S104a:

S104a: The network node 200 obtains user-specific throughput per scheduling opportunity for each of the terminal devices 300a, 300b, ..., 300k, ... 300N. The order is then determined by individually weighting the user-specific delay and individually weighting the user-specific channel conditions together with the user-specific throughput per scheduling opportunity for each of the terminal devices 300a, 300b, ..., 300k, ... 300N to be scheduled.

The network node 200 is thereby configured to prioritize real time conversational packets and media consumption packets over non-real time packets, whilst still scheduling non-real time packets according to a minimum acceptable throughput. Setting a high value for packet delay budget may result in a reduction of the real time conversational application quality experienced by the end users of the terminal devices 300a, 300b, ..., 300k, ... 300N. On the other hand, setting a small value for packet delay budget may result in a reduced average uplink and downlink throughput for non-real time packets.

There may be different ways to individually weighting the user-specific delay and individually weighting the user-specific channel conditions for each terminal device 300a, 300b, ..., 300k, ... 300N to be scheduled.

In some aspects the network node 200 explicitly determines weight factors that are used when weighting the user-specific delay and weighting the user-specific channel conditions. Particularly, according to an embodiment the network node 200 is configured to perform (optional) step S102:

S102: The network node 200 determines, per scheduling opportunity, a delay weight factor, denoted $\alpha_D$, and a channel condition weight factor, denoted $\alpha_F$, for each terminal device 300a, 300b, ..., 300k, ... 300N. The user-specific delay is weighted with the delay weight factor $\alpha_D$ and the user-specific channel conditions are weighted with the channel condition weight factor $\alpha_F$.

In some aspects the network node 200 explicitly determines weight factors also for the user-specific throughput. Particularly, according to an embodiment the network node 200 is configured to perform (optional) step S102a:

S102a: The network node 200 determines, per scheduling opportunity, a throughput weight factor, denoted $\alpha_{RRE}$, for each terminal device 300a, 300b, ..., 300k, ... 300N. The user-specific throughput is weighted with the throughput weight factor $\alpha_{RRE}$.

A scalar metric, denoted $M_k(t)$, for terminal device k (where k=1,2, ..., N and N is the total number of terminal devices to be scheduled) to be used at a scheduling opportunity occurring at time t might then be determined. That is, according to an embodiment, a scalar metric $M_k(t)$ is determined for each terminal device 300a, 300b, ..., 300k, ... 300N per scheduling opportunity in order to determine the order. During the scheduling the terminal devices might then be selected from highest metric to lowest metric (i.e. starting with the terminal device having highest value of $M_k(t)$ and ending with the terminal device having lowest value of $M_k(t)$). When a separate value of the scalar metric $M_k(t)$ has been determined for each terminal device, the values are thus then used as part of a ranking operator in the scheduler.

There could be different parameters on which the scalar metric $M_k(t)$ depends.

In some aspects the scalar metric $M_k(t)$ depends on the maximum allowed system-wise delay, denoted $D_{max}$. Particularly, according to an embodiment, the scalar metric $M_k(t)$ is a function of maximum allowed system-wise delay $D_{max}$.

In some aspects the scalar metric $M_k(t)$ depends on the packet delay for each terminal device k. Particularly, according to an embodiment, the scalar metric $M_k(t)$ is a function of packet delay, denoted $D_k(AoP)$, determined for each terminal device 300a, 300b, ..., 300k, ... 300N to be scheduled. The packet delay $D_k(AoP)$ represents age of a packet (AoP) to be scheduled for terminal device k, for k=1, ..., N.

In some aspects, the delay function $D_k(AoP)$ is for non-real time (non-RT) applications, real time conversational (RTC) applications, media consumption (MC) applications, and social and sharing (SS) applications obtained as below, where the symbol "⇔" denotes "in case of", and int(x) denotes the integer of the variable x:

$$D_k(AoP) = \begin{cases} \text{if int}(AoP/t_{RTC\text{-}step}) \geq n \\ (n+1)AoP \\ \text{else} \\ (1 + \text{int}(AoP/t_{RTC\text{-}step}))AoP \\ AoP \Leftrightarrow MC \ \& \ SS \\ 0 \Leftrightarrow \text{non-}RT \end{cases} \Leftrightarrow RTC$$

The values of $t_{RTC\text{-}step}$ and n could be configurable and, for example, be set by mobile network operators. This could be advantageous since the mouth-to-ear delay might depend on the actual network deployment. Some deployments lead to longer delays in the core network and/or transport network than other deployments. A typical value of the parameter $t_{RTC\text{-}step}$ is 20 ms. A typical value for the parameter n is 3. The packet delay budget might be different for different services within a communications system, such as within an LTE based communications system. A typical value for the real time conversational packet delay budget $t_{RTC\text{-}max}$ is 100 ms. A typical value for the media consumption $t_{MC\text{-}max}$ is 300 ms.

In some aspects the scalar metric $M_k(t)$ depends on the instantaneous reported and adjusted channel quality of terminal device k, representing the requested data rate before scheduling. Particularly, according to an embodiment the scalar metric $M_k(t)$ is a function of instantaneous channel quality, denoted $CQI_k(t)$, determined for each terminal device 300a, 300b, . . . , 300k, . . . 300N to be scheduled.

In some aspects the scalar metric $M_k(t)$ depends on the maximum used, or allowed, CQI value in the system. Particularly, according to an embodiment the scalar metric $M_k(t)$ is a function of maximum system-wise channel quality, denoted $CQI_{max}$.

In some aspects the scalar metric $M_k(t)$ depends on the moving average throughput of terminal device k, representing the average data rate of the terminal devices after scheduling. Particularly, according to an embodiment the scalar metric $M_k(t)$ is a function of moving average throughput, denoted $T_k(t)$, determined for each terminal device 300a, 300b, . . . , 300k, . . . 300N to be scheduled.

In some aspects the scalar metric $M_k(t)$ depends on the instantaneous throughput of terminal device k, representing the scheduled data rate. Particularly, according to an embodiment the scalar metric $M_k(t)$ is a function of instantaneous throughput, denoted $R_k(t)$, determined for each terminal device 300a, 300b, . . . , 300k, . . . 300N to be scheduled.

In some aspects the scalar metric $M_k(t)$ depends on the delay weight factor $\alpha_D$ for prioritizing real time sensitive packets over non-real time sensitive packets. Particularly, according to an embodiment, the maximum allowed delay $D_{max}$ and the packet delay $D_k(AoP)$ are weighted with the delay weight factor $\alpha_D$.

In some aspects the scalar metric $M_k(t)$ depends on the channel condition weight factor $\alpha_F$ for fairness. Particularly, according to an embodiment the instantaneous channel quality $CQI_k(t)$ and the maximum system-wise channel quality $CQI_{max}$ are weighted with the channel condition weight factor $\alpha_F$.

In some aspects the scalar metric $M_k(t)$ depends on the throughput weight factor $\alpha_{RRE}$ for radio resource efficiency. Particularly, according to an embodiment the moving average throughput $T_k(t)$ and the instantaneous throughput $R_k(t)$ are weighted with the throughput weight factor $\alpha_{RRE}$.

There could be different ways to determine the delay weight factor $\alpha_D$, the channel condition weight factor $\alpha_F$, and the throughput weight factor $\alpha_{RRE}$. Particularly, according to an embodiment the delay weight factor $\alpha_D$, the channel condition weight factor $\alpha_F$, and the throughput weight factor $\alpha_{RRE}$ are mutually dependent on each other. In some aspects the delay weight factor $\alpha_D$, the channel condition weight factor $\alpha_F$, and the throughput weight factor $\alpha_{RRE}$ are determined such that:

$$\alpha_D + \alpha_{RRE} + s \cdot \alpha_F = 1,$$

where s is a scale factor. The scale factor s has a configurable value and thus defines the ratio between $\alpha_D$, $\alpha_F$ and $\alpha_{RRE}$. In some aspects $\alpha_D$, $\alpha_F$ and $\alpha_{RRE}$ take values in the interval [0, 1].

The network node 200 might be configured to increase $\alpha_F$ (for increased flow efficiency) and $\alpha_{RRE}$ (for increased resource efficiency) slowly and decrease them sharply to respond faster to the maximum user delay threshold.

Collectively, based on parameters as defined above, the scalar metric $M_k(t)$ for terminal device k at time t is, according to an embodiment, given by:

$$M_k(t) = \alpha_D \cdot \left(\frac{D_k(AoP)}{D_{max}}\right) + \alpha_{RRE} \cdot \log\left(\frac{R_k(t)}{T_k(t)}\right) - \alpha_F \cdot \log\left(\frac{CQI_k(t)}{CQI_{max}}\right),$$

where log(x) denotes the logarithm of x. The scalar metric $M_k(t)$ could then be optimized to guarantee a sufficient performance to run a communication application at an acceptable cell edge quality. One way to optimize the scalar metric $M_k(t)$ is to adjust the values of $\alpha_D$, $\alpha_F$ and $\alpha_{RRE}$. Therefore, in some aspects the values of $\alpha_D$, $\alpha_F$ and $\alpha_{RRE}$ are considered for updating per scheduling opportunity. One factor to determined whether to update the values of $\alpha_D$, $\alpha_F$ and $\alpha_{RRE}$ is to compare the age of a packet to a threshold delay value.

For example, the network node 200 might check whether the age of a packet is above or below a threshold delay value. There could be different threshold delay values, for example, depending on user requirements or network requirements. Examples of standardized CQI characteristics, such as packet delay budget, that might be used to determine suitable threshold delay values are given in Table 6.1.7 in 3GPP TS 23.203 version 15.0.0. A typical threshold delay value is in the order of 70 ms. Another typical threshold delay value is in the order of 50 ms. Yet another typical threshold delay value is in the order of 100 ms.

Depending on the outcome the check, the network node 200 might then, per scheduling opportunity, update the values of $\alpha_D$, $\alpha_F$ and $\alpha_{RRE}$.

The delay weight factor $\alpha_D$ might be decreased if the age of a packet AoP is below the threshold delay value. Particularly, according to an embodiment the network node 200 is configured to perform (optional) step S108a when the age of a packet AoP is below the threshold delay value:

S108a: The network node 200 decreases the delay weight factor $\alpha_D$ for a next scheduling opportunity.

Since, according to an embodiment, the delay weight factor $\alpha_D$, the channel condition weight factor $\alpha_F$, and the throughput weight factor $\alpha_{RRE}$ are mutually dependent on each other, decreasing the delay weight factor $\alpha_D$ causes increase of at least one of the channel condition weight factor $\alpha_F$ and the throughput weight factor $\alpha_{RRE}$. However, it could be that the delay weight factor $\alpha_D$ has already reached it lower limit (or conversely that at least one of the channel condition weight factor $\alpha_F$ and the throughput weight factor $\alpha_{RRE}$ has already reached it upper limit) and in this case a further increase of the at least one of the channel condition weight factor $\alpha_F$ and the throughput weight factor $\alpha_{RRE}$ might not be possible.

The delay weight factor $\alpha_D$ might be increased if the age of a packet AoP is higher than a factor n>1 times the threshold delay value. Particularly, according to an embodiment the network node 200 is configured to perform (optional) step S108b when the age of a packet AoP is higher than a factor n>1 times the threshold delay value:

S108b: The network node 200 increases the delay weight factor $\alpha_D$ with a step value for a next scheduling opportunity.

Since, according to an embodiment, the delay weight factor $\alpha_D$, the channel condition weight factor $\alpha_F$, and the throughput weight factor $\alpha_{RRE}$ are mutually dependent on each other, increasing the delay weight factor $\alpha_D$ causes decrease of at least one of the channel condition weight factor $\alpha_F$ and the throughput weight factor $\alpha_{RRE}$. However, it could be that the delay weight factor $\alpha_D$ has already reached it upper limit (or conversely that at least one of the channel condition weight factor $\alpha_F$ and the throughput weight factor $\alpha_{RRE}$ has already reached it lower limit) and in this case a further decrease of the at least one of the channel condition weight factor $\alpha_F$ and the throughput weight factor $\alpha_{RRE}$ might not be possible.

The delay weight factor $\alpha_D$ might be decreased if the age of a packet AoP is not higher than the factor n times the threshold delay value. Particularly, according to an embodiment the network node 200 is configured to perform (optional) step S108c when the age of a packet AoP is not higher than the factor n times the threshold delay value:

S108c: The network node 200 increases the delay weight factor $\alpha_D$ to its maximum value for a next scheduling opportunity.

Since, again, according to an embodiment, the delay weight factor $\alpha_D$, the channel condition weight factor $\alpha_F$, and the throughput weight factor $\alpha_{RRE}$ are mutually dependent on each other, increasing the delay weight factor $\alpha_D$ causes decrease of at least one of the channel condition weight factor $\alpha_F$ and the throughput weight factor $\alpha_{RRE}$. However, it could be that the delay weight factor $\alpha_D$ has already reached it upper limit (or conversely that at least one of the channel condition weight factor $\alpha_F$ and the throughput weight factor $\alpha_{RRE}$ has already reached it lower limit) and in this case a further decrease of the at least one of the channel condition weight factor $\alpha_F$ and the throughput weight factor $\alpha_{RRE}$ might not be possible.

No change of the delay weight factor $\alpha_D$ is needed if the age of the packet equals, or is within a minimum distance from, the threshold delay value. The minimum distance could be in the order of 5% or 10% of the threshold delay value. In some aspects the minimum distance depends on the value of the factor n and/or the factor $t_{RTC-step}$, which are both configurable.

One particular embodiment for downlink scheduling of terminal devices 300a, 300b, . . . , 300k, . . . 300N as performed by the network node 200 based on the above disclosed embodiments, aspects, and examples will now be disclosed with reference to FIG. 4.

S201: The channel condition weight factor $\alpha_F$ is assigned its maximum value (typically, $\alpha_F=1$) and the delay weight factor $\alpha_D$ as well as the throughput weight factor $\alpha_{RRE}$ are assigned their minimum values (typically, $\alpha_D=0$ and $\alpha_{RRE}=0$)

S202: A value of the scalar metric $M_k(t)$ is determined for each terminal device k at time t to be scheduled in the current scheduling opportunity. The network node schedules the terminal devices in an order from highest to lowest scalar metric value by performing step S203 and any of steps S203-S209 for each terminal device.

S203: The network node 200 in the next scheduling opportunity compares the age of packet for terminal device k to $t_{RTC-step}$ by computing $z=\text{int}(AoP/t_{RTC-step})$. Step S204 is entered if z≥n. Step S206 is entered if 0<z<n. Step S208 is entered if z=0.

S204: If the delay weight factor $\alpha_D$ has reached its maximum value, the delay weight factor $\alpha_D$ is not updated. Possibly one of the channel condition weight factor $\alpha_F$, and the throughput weight factor $\alpha_{RRE}$ might be increased whilst the other is decreased. Otherwise, the channel condition weight factor $\alpha_F$, and the throughput weight factor $\alpha_{RRE}$ are not updated.

S205: If the delay weight factor $\alpha_D$ has not reached its maximum value, the delay weight factor $\alpha_D$ is maximizes and both the channel condition weight factor $\alpha_F$ as well as the throughput weight factor $\alpha_{RRE}$ are decreased to their respective minimum values.

S206: If the delay weight factor $\alpha_D$ has reached its maximum value, the delay weight factor $\alpha_D$ is not updated. Possibly one of the channel condition weight factor $\alpha_F$, and the throughput weight factor $\alpha_{RRE}$ might be increased whilst the other is decreased. Otherwise, the channel condition weight factor $\alpha_F$, and the throughput weight factor $\alpha_{RRE}$ are not updated.

S207: If the delay weight factor $\alpha_D$ has not reached its maximum value, the delay weight factor $\alpha_D$ is increased with an up-step value and at least one of the channel condition weight factor $\alpha_F$ and the throughput weight factor $\alpha_{RRE}$ are decreased with a down-step value.

S208: If the delay weight factor $\alpha_D$ has reached its minimum value, the delay weight factor $\alpha_D$ is not updated. Possibly one of the channel condition weight factor $\alpha_F$, and the throughput weight factor $\alpha_{RRE}$ might be increased whilst the other is decreased. Otherwise, the channel condition weight factor $\alpha_F$, and the throughput weight factor $\alpha_{RRE}$ are not updated.

S209: If the delay weight factor $\alpha_D$ has not reached its minimum value, the delay weight factor $\alpha_D$ is decreased with a down-step value and at least one of the channel condition weight factor $\alpha_F$ and the throughput weight factor $\alpha_{RRE}$ are increased with an up-step value.

S210: Step S203 is entered again for the next ordered terminal device until all terminal devices have been scheduled in the scheduling opportunity. Step S211 is then entered.

S211: Step S202 is entered again for the next scheduling opportunity, and execution halts if there are no more scheduling opportunities.

Figure 5:
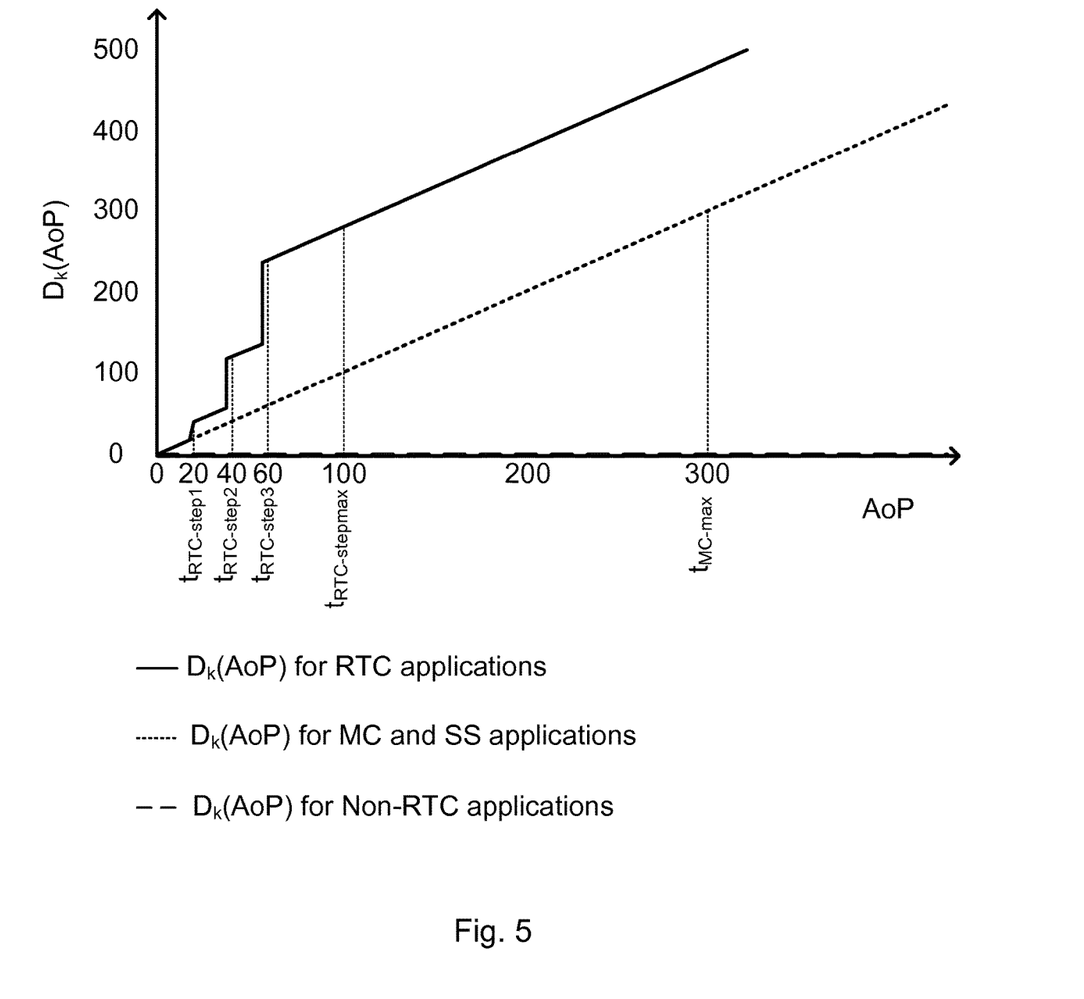
FIG. 5 shows simulation results according to an embodiment.

Reference is now made to FIG. 5 showing simulation results of the herein proposed scheduling.

FIG. 5 shows $D_k(AoP)$ as a function of time for terminal devices scheduled with three different types of services; terminal devices with RTC applications, terminal devices with MC and SS applications, and terminal devices with non-RTC applications. Here the time also defines the age of packet.

$D_k(AoP)$ for RTC applications is piece-wise linear with discontinuities at predefined time steps of n times of $t_{RTC-step}$ and $t_{max}$, where $t_{max}$ is the packet delay budget for RTC applications. This will prioritize RTC applications over MC and SS applications.

$D_k(AoP)$ for MC and SS applications changes linearly with the age of packet. $D_k(AoP)$ for non-RTC applications is zero until a threshold time value (not illustrated in FIG. 5) that depends on the number of retransmissions, signal quality etc. With $D_k(AoP)$ set according to the above, terminal devices with non-RTC applications will not have priority over terminal devices with RTC applications and MC and SS applications until necessary.

Figure 6:
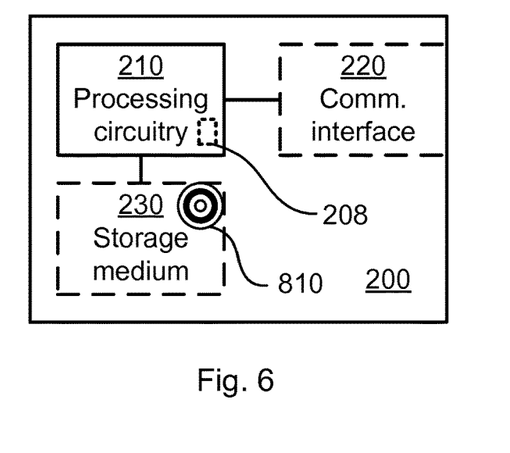
FIG. 6 is a schematic diagram showing functional units of a network node according to an embodiment.

FIG. 6 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA). In some aspects the processing circuitry 210 implements the functionality of the scheduler 208.

Particularly, the processing circuitry 210 is configured to cause the network node 200 to perform a set of operations, or steps, S102-S108c, S201-S211, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, devices, nodes, terminals, and functions of the communications system 100. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 7:
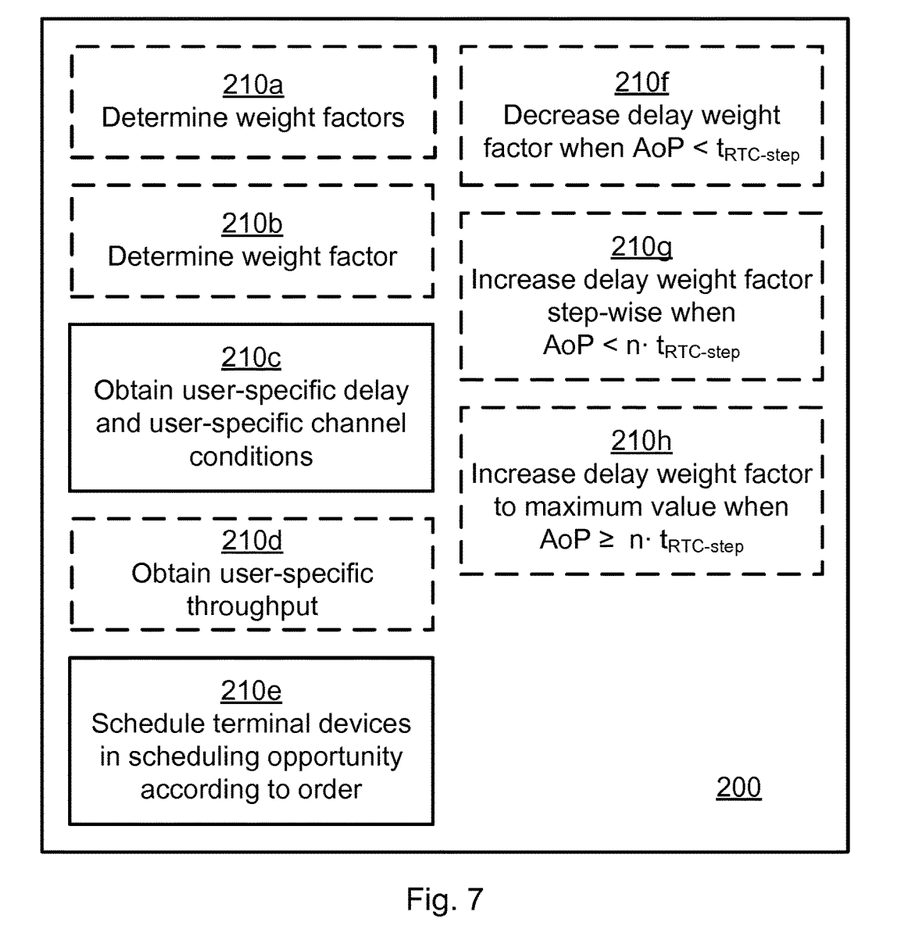
FIG. 7 is a schematic diagram showing functional modules of a network node according to an embodiment.

FIG. 7 schematically illustrates, in terms of a number of functional modules, the components of a network node 200 according to an embodiment. The network node 200 of FIG. 7 comprises a number of functional modules; an obtain module 210c configured to perform step S104 and a schedule module 210e configured to perform step S106. The network node 200 of FIG. 7 may further comprise a number of optional functional modules, such as any of a determine module 210a configured to perform step S102, a determine module 210b configured to perform step S102a, an obtain module 210d configured to perform step S104a, a decrease module 210f configured to perform step S108a, an increase module 210g configured to perform step S108b, and an increase module 210h configured to perform step S108c.

In general terms, each functional module 210a-210h may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210h may be implemented by the processing circuitry 210, possibly in cooperation with the communications interface 220 and/or the storage medium 230. The processing circuitry 210 may thus be configured to from the storage medium 230 fetch instructions as provided by a functional module 210a-210h and to execute these instructions, thereby performing any steps as disclosed herein.

The network node 200 may be provided as a standalone device or as a part of at least one further device. For example, the network node 200 may be provided in a node of the radio access network 110 or in a node of the core network. 120 Alternatively, functionality of the network node 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the terminal devices 300a-300N than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 6 the processing circuitry 210 may be distributed among a plurality of devices, or nodes. The same applies to the functional modules 210a-210h of FIG. 7 and the computer program 820 of FIG. 8 (see below).

Figure 8:
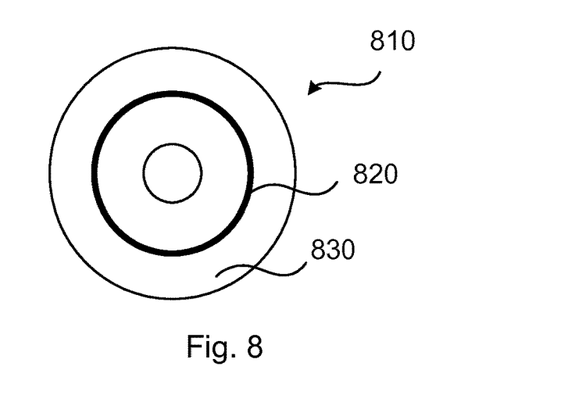
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A network node for downlink scheduling of terminal devices, the network node comprising processing circuitry, the processing circuitry being configured to cause the network node to:
 obtain user-specific delay and user-specific channel conditions per scheduling opportunity for each of the terminal devices to be scheduled; and
 schedule, in each scheduling opportunity, the terminal devices according to an order,
 wherein the order is determined by individually weighting the user-specific delay and individually weighting the user-specific channel conditions for each terminal device to be scheduled,
 wherein a scalar metric $M_k(t)$ is determined for each terminal device per scheduling opportunity in order to determine the order, and
 wherein the scalar metric $M_k(t)$ is a function of maximum allowed system-wise delay $D_{max}$.

2. The network node according to claim 1, wherein the processing circuitry further is configured to cause the network node to:
 obtain user-specific throughput per scheduling opportunity for each of the terminal devices be scheduled; and
 wherein the order is determined by individually weighting the user-specific delay and individually weighting the user-specific channel conditions together with the user-specific throughput per scheduling opportunity for each of the terminal devices to be scheduled.

3. The network node according to claim 2, wherein the processing circuitry further is configured to cause the network node to:
 determine, per scheduling opportunity, a throughput weight factor $\alpha_{RRE}$ for each terminal device,
 wherein the user-specific throughput is weighted with the throughput weight factor $\alpha_{RRE}$.

4. The network node according to claim 3, wherein the scalar metric $M_k(t)$ is a function of moving average throughput $T_k(t)$ determined for each terminal device to be scheduled and is also a function of instantaneous throughput $R_k(t)$ determined for each terminal device to be scheduled, wherein the moving average throughput $T_k(t)$ and the instantaneous throughput $R_k(t)$ are weighted with the throughput weight factor $\alpha_{RRE}$.

5. The network node according to claim 1, wherein the processing circuitry further is configured to cause the network node to:
 determine, per scheduling opportunity, a delay weight factor $\alpha_D$ and a channel condition weight factor $\alpha_F$ for each terminal device,
 wherein the user-specific delay is weighted with the delay weight factor $\alpha_D$ and the user-specific channel conditions are weighted with the channel condition weight factor $\alpha_F$.

6. The network node according to claim 5, wherein the processing circuitry further is configured to cause the network node to:
 obtain user-specific throughput per scheduling opportunity for each of the terminal devices be scheduled, wherein the order is determined by individually weighting the user-specific delay and individually weighting the user-specific channel conditions together with the user-specific throughput per scheduling opportunity for each of the terminal devices to be scheduled; and
 determine, per scheduling opportunity, a throughput weight factor $\alpha_{RRE}$ for each terminal device, wherein the user-specific throughput is weighted with the throughput weight factor $\alpha_{RRE}$, wherein the delay weight factor $\alpha_D$, the channel condition weight factor $\alpha_F$, and the throughput weight factor $a_{RRE}$ are mutually dependent on each other.

7. The network node according to claim 5, wherein the scalar metric $M_k(t)$ for terminal device k at time t is given by:

$$M_k(t) = \alpha_D \cdot \left( \frac{D_k(AoP)}{D_{max}} \right) + \alpha_{RRE} \cdot \log\left( \frac{R_k(t)}{T_k(t)} \right) - \alpha_F \cdot \log\left( \frac{CQI_k(t)}{CQI_{max}} \right)$$

wherein $D_k(AoP)$ is a packet delay determined for each terminal device to be scheduled, where the packet delay $D_k(AoP)$ is a function of an age of a packet, AoP, to be scheduled for terminal device k, for k=1, . . . , N, wherein the packet delay $D_k(AOP)$ is the user-specific delay obtained for terminal device k;
 wherein $\alpha_D$ is a delay weight factor with which the user-specific delay for each terminal device k is individually weighted;
 wherein $R_k(t)$ is instantaneous throughput determined for each terminal device k to be scheduled;
 wherein $T_k(t)$ is moving average throughput determined for each terminal device k to be scheduled;
 wherein $\alpha_{RRE}$ is a throughput weight factor;
 wherein $CQI_k(t)$ is instantaneous channel quality determined for each terminal device k to be scheduled, wherein $CQI_k(t)$ is the user-specific channel conditions obtained for terminal device k;
 wherein $CQI_{max}$ is a maximum system-wise channel quality;
 wherein $\alpha_F$ is a channel condition weight factor with which the user-specific channel conditions for each terminal device k is individually weighted; and
 wherein log(x) denotes a logarithm of x.

8. The network node according to claim 5, wherein the processing circuitry further is configured to cause the network node to:
 when the age of a packet, AoP, is below a threshold delay value, decrease the delay weight factor $\alpha_D$ for a next scheduling opportunity;
 when the age of a packet, AoP, is higher than a factor n>1 times the threshold delay value, increase the delay weight factor $\alpha_D$ with a step value for a next scheduling opportunity; and
 when the age of a packet, AoP, is not higher than the factor n times the threshold delay value, increase the delay weight factor $\alpha_D$ to a maximum value for a next scheduling opportunity.

9. The network node according to claim 1, wherein the scalar metric $M_k(t)$ is a function of packet delay $D_k(AoP)$ determined for each terminal device to be scheduled, where the packet delay $D_k(AoP)$ is a function of an age of a packet, AoP, to be scheduled for terminal device k, for k=1, . . . , N, wherein the packet delay $D_k(AoP)$ is the user-specific delay obtained for terminal device k.

10. The network node according to claim 9, wherein $\alpha_D$ is a delay weight factor with which the user-specific delay for each terminal device k is individually weighted, and wherein the maximum allowed system-wide delay $D_{max}$ and the packet delay $D_k(AoP)$ are weighted with the delay weight factor $\alpha_D$.

11. The network node according to claim 10, wherein the scalar metric $M_k(t)$ is a function of $$\alpha_D \cdot \left( \frac{D_k(AoP)}{D_{max}} \right).$$

12. The network node according to claim 1, wherein the scalar metric $M_k(t)$ is a function of instantaneous channel quality $CQI_k(t)$ determined for each terminal device to be scheduled, wherein $CQI_k(t)$ is the user-specific channel conditions obtained for terminal device k.

13. The network node according to claim 12, wherein $\alpha_F$ is a channel condition weight factor with which the user-specific channel conditions for each terminal device k is individually weighted, and wherein the instantaneous channel quality $CQI_k(t)$ and a maximum system-wise channel quality $CQI_{max}$ are weighted with the channel condition weight factor $\alpha_F$.

14. The network node according to claim 1, wherein the network node is configured for use in a communication system that comprises a radio access network and a core network, wherein the scalar metric $M_k(t)$ is a function of maximum system-wise channel quality $CQI_{max}$, wherein the maximum system-wise channel quality $CQI_{max}$ is a maximum channel quality indicator value used or allowed in the communication system.

15. The network node according to claim 1, wherein the scalar metric $M_k(t)$ is a function of moving average throughput $T_k(t)$ determined for each terminal device to be scheduled.

16. The network node according to claim 1, wherein the scalar metric $M_k(t)$ is a function of instantaneous throughput $T_k(t)$ determined for each terminal device to be scheduled.

17. The network node according to claim 1, wherein the user-specific delay obtained for each terminal device to be scheduled with a first service is obtained as a first function of an age of a packet (AoP) to be scheduled for the terminal device, wherein the first function is a piece-wise linear function with discontinuities at predefined AoP values.

18. The network node according to claim 17, wherein the user-specific delay obtained for each terminal device to be scheduled with a second service is obtained as a second function of an age of a packet (AoP) to be scheduled for the terminal device, wherein according to the second function the user-specific delay changes linearly with the AoP to be scheduled for the terminal device.

19. The network node according to claim 18, wherein the first service is a real-time communication (RTC) service, and wherein the second service is a media consumption service or a social and sharing service.

20. The network node according to claim 1, wherein the network node is configured for use in a communication system that comprises a radio access network and a core network, wherein the maximum allowed system-wise delay $D_{max}$ is a maximum delay allowed with respect to the communication system.

21. A method for downlink scheduling of terminal devices, the method being performed by a network node, the method comprising:
obtaining user-specific delay and user-specific channel conditions per scheduling opportunity for each of the terminal devices to be scheduled; and
scheduling, in each scheduling opportunity, the terminal devices according to an order,
wherein the order is determined by individually weighting the user-specific delay and individually weighting the user-specific channel conditions for each terminal device to be scheduled,
wherein a scalar metric $M_k(t)$ is determined for each terminal device per scheduling opportunity in order to determine the order, and
wherein the scalar metric $M_k(t)$ is a function of maximum allowed system-wise delay $D_{max}$.

22. The method according to claim 21, further comprising:
obtaining user-specific throughput per scheduling opportunity for each of the terminal devices to be scheduled; and
wherein the order is determined by individually weighting the user-specific delay and individually weighting the user-specific channel conditions together with the user-specific throughput per scheduling opportunity for each of the terminal devices to be scheduled.

23. The method according to claim 21, further comprising:
determining, per scheduling opportunity, a delay weight factor $\alpha_D$ and a channel condition weight factor $\alpha_F$ for each terminal device,
wherein the user-specific delay is weighted with the delay weight factor $\alpha_D$ and the user-specific channel conditions are weighted with the channel condition weight factor $\alpha_F$.

24. The method according to claim 22, further comprising:
determining, per scheduling opportunity, a throughput weight factor $\alpha_{RRE}$ for each terminal device,
wherein the user-specific throughput is weighted with the throughput weight factor $\alpha_{RRE}$.

25. A non-transitory computer readable storage medium on which is stored a computer program for downlink scheduling of terminal devices, the computer program comprising computer code which, when run on processing circuitry of a network node, causes the network node to:
obtain user-specific delay and user-specific channel conditions per scheduling opportunity for each of the terminal devices to be scheduled; and
schedule, in each scheduling opportunity, the terminal devices according to an order,
wherein the order is determined by individually weighting the user-specific delay and individually weighting the user-specific channel conditions for each terminal device to be scheduled,
wherein a scalar metric $M_k(t)$ is determined for each terminal device per scheduling opportunity in order to determine the order, and
wherein the scalar metric $M_k(t)$ is a function of maximum allowed system-wise delay $D_{max}$.

* * * * *